United States Patent [19]

Vollmer

[11] 4,294,402
[45] Oct. 13, 1981

[54] CONTROL DEVICES FOR HEATERS

[75] Inventor: Rudolf Vollmer, Mosbach, Fed. Rep. of Germany

[73] Assignee: Honeywell Inc., Minneapolis, Minn.

[21] Appl. No.: 953,453

[22] Filed: Oct. 23, 1978

[30] Foreign Application Priority Data

Oct. 26, 1977 [DE] Fed. Rep. of Germany ....... 2747969

[51] Int. Cl.³ ............................................ G09D 23/13
[52] U.S. Cl. .................................. 236/12 R; 236/42; 236/99 E
[58] Field of Search ............... 236/42, 43, 12 R, 99 E; 237/8 C; 165/35, 36

[56] References Cited

U.S. PATENT DOCUMENTS

| | | | |
|---|---|---|---|
| 1,795,860 | 3/1931 | Jaeger | 236/42 |
| 1,875,851 | 9/1932 | Carson | 236/42 |
| 1,962,214 | 6/1934 | Russell et al. | 236/12.2 |
| 2,810,523 | 10/1957 | Branson | 236/12 R |
| 3,397,841 | 8/1968 | Kieslich | 236/12 R X |
| 3,929,283 | 12/1975 | Delpla | 236/12.2 |
| 3,955,759 | 5/1976 | Knapp | 236/12.2 |
| 4,114,682 | 9/1978 | Knud | 236/99 E X |
| 4,165,034 | 8/1979 | Rogers, Jr. et al. | 236/12.2 |

*Primary Examiner*—William E. Tapolcai, Jr.
*Attorney, Agent, or Firm*—William T. Howell

[57] ABSTRACT

Control devices for heating installations are disclosed, which heating installations are provided with thermostat controls. The control devices sense the temperature of the heating medium, e.g., water, to be passed to the heating installation and to be returned therefrom. The temperature difference actuates a control for mixing or directing the flow of the medium in the desired volumes. Use is made of control pistons and expansion material to provide control devices which are particularly capable of optimum energy utilization.

13 Claims, 4 Drawing Figures

CONTROL DEVICES FOR HEATERS

The invention is concerned with control devices for heating installations in which at least some of the radiators are individually temperature controlled.

A control device of this type is known per se. It has a mixing device for the heating medium, preferably a liquid heat carrier, for example, hot water, which is introduced thereinto, the heating medium having been heated by a heater installation, particularly a boiler. Furthermore, it comprises a connection for the return of the heat carrier from the radiators. The two partial streams are mixed with each others in the mixing device and they leave the device through a third connection which communicates with the line leading to the radiators. The mixing ratio of the two entering streams depends on the respective heat requirements. In one extreme, only returned water or the like passes through the device, while in the other extreme, only hot water or the like, emanating from a boiler, is passed through the mixing device. Between these two extremes various ratios are possible.

The known control device operates, just like a control device in accordance with the present invention, without auxiliary energy input. In prior art devices, the temperature of the heating medium, passed to the radiators, that is the temperature of the heating medium leaving the mixing device, is controlled independently of the amount of the medium passing through the line per unit time. The circulating volume is thereby controlled, by means of thermostatic radiator valves. Thus, a hydraulically operating control system is provided which comprises the thermostatic valves of the radiators and a three-way mixing valve which controls the circulating heating medium. The thermostatic valve controls introduction of the inlet volume to the radiators in relation to changes in room temperatures. Resulting changes of the throughput are adjusted by the three-way mixing valve. The latter, thus, determines the heating ratio, i.e., the quantity of hot medium passed from the boiler into the inlet line and, consequently, the temperature of the medium therein. Each change of a thermostatic valve causes, due to associated changes of its throughput volume, a control movement of the mixing device in such a manner that the mixing ratio between boiler medium and return medium is varied. The temperature of the heating medium passing to the radiator is adjusted to meet respective requirements.

It is a disadvantage of a control device in accordance with the prior art that for measuring the respective streams, measuring devices having relatively large surface areas are required in order to determine the pressure differential in the boiler inlet line and the inlet line to the heater system and to convert the value obtained into the appropriate control signal. A small dimensioned measuring device requires a high pump pressure in order to maintain a sufficiently high pressure differential at the throttle location. High pump pressures, however, lead to expensive designs.

It is accordingly an object of the present invention to provide a control device for a heating installation which does not require a measuring device having a large surface area and does not require high pump pressures and with which temperatures of the medium to be passed to radiators can be maintained at the lowest possible value in order to achieve an optimum energy utilization.

In one broad aspect the invention provides a control device for heating installations, wherein at least some of the radiators are individually temperature controlled which comprises a mixing device which is adjustable by means of a control device which is sensitive to a temperature difference in the heating medium passed to the radiators and returned therefrom. The temperature of the heating medium is regulated in an advantageous manner, automatically, and in relation to the temperature difference. By means of appropriate configuration and arrangement of the control device, the temperature difference is automatically adjusted to that valve which is optimum for energy utilization. For example, when a room is maintained, by the influence of an extraneous heat influence, at a temperature of 20° C., the heating installation can be operated with the temperature of the heating medium to be passed to the radiators and returned therefrom being 20° C. In this case, the temperature difference is 0° C. At the highest inlet temperature, for example, 90° C., corresponding to the temperature of the medium passed from a boiler, and at a return temperature of 70° C., the temperature difference is 20° C. This means that, at the values indicated, the temperature difference is in the range of 0° C. to 20° C. and the temperature of the medium passed to the radiators is optimally adapted to the respective energy requirements. Particularly in cooperation with a thermostatic radiator valve each extraneous heat influence can in ideal manner quickly be compensated for. The trouble-free functioning of the control device is possible even with a relatively simple configuration of the control device.

In accordance with the present invention there is provided a control device for heating installation, said heating installation including at least one individually temperature-controlled radiator means; means for passing a heating medium to the heating installation; and means for returning the heating medium from the heating installation, said device comprising: means for determining a temperature difference in the temperature of the heating medium passed to the heating installation and the temperature of the heating medium being returned from the heating installation; and control means actuable in response to the temperature difference of the heating medium being passed to the heating installation and being returned from the heating installation.

In one embodiment of the invention it is proposed that for control of the throughput permitting cross-sectional areas of the individual streams, or partial streams, at increasing return temperatures, the throughput volume of the heated medium emanating from the boiler is increased and/or the volume of the medium to be added thereto is decreased.

In one embodiment the return can comprise a control device wherein an orifice opening is determined, on the one hand by a sensor determining the temperature of the medium to be passed to the radiators and, on the other hand, by a sensor for the returned medium. Of consequence is also the respective temperature difference. In the event of a low temperature difference, i.e., in the event of comparatively higher or increasing return temperatures, the throughput through the control device is increased which also results in an increase of the volume of the medium flowing from a boiler or the like. When the return temperature decreases, which leads to an increase of the temperature difference, the volume of the hot medium flowing from the boiler, in the following for sake of simplicity only discussed with respect to the water, is thereby reduced that the outflow cross-sectional area for the returned medium is reduced.

It is to be noted that the control operation is assisted by the action of thermostatic radiator valves which, in dependence of the temperature of a room in which the respective radiator is located, either throttle the throughput through the radiator, more or less effectively, or more or less increase the throughput. Due to extraneous heat influence, or on reaching the room temperature to which the thermostatic valve is set, the latter reaches its throttling or closed positions. The flow through the radiator is thereby decreased. The relative lengthy residence time of the hot water in the radiator leads to an increase in heat transfer and thereby a cooling of the medium to be returned. The decreasing return medium temperature, in turn, causes an increase of the temperature difference which determines the degree of opening of an orifice of the control device in the return line. In the latter case, the decreasing temperature of the returned medium leads to a throttling of the return medium and, thereby, indirectly, to throttling of the medium passed to the radiators. Thus, the flow of hot water is throttled or disrupted depending on the reduced heating requirements for the room. This leads in the desired manner to an optimum energy utilization and to a lowest possible temperature of the medium to be passed to the radiators.

In accordance with another embodiment, there is provided, in agreement with a control device of the prior art, a control device including a mixing assembly for the medium to the passed to the heating installation and for the medium to be returned therefrom. In consequency thereof, disregarding extreme positions, there is always a partial stream of the returned medium passed to the boiler, or to the return line to the district heating network, or other like delivery system, while the balance of the returned medium is added to the introduced heating medium in the proportions corresponding to the respective requirements. The functioning of this embodiment is in principle the same as the embodiment discussed. Again there is provided a sensor in the return line and in the line passing the heating medium to the heating installation which sensors actuate the mixing assembly. For example, when the temperature of the medium to be passed to the heating installation increases, the cross-sectional area of the inlet opening for the heated medium is increased and the cross-sectional area of the opening for the returned medium is decreased. When the temperature of the returned medium increases, the corresponding opening is decreased, i.e., the volume of returned medium to be added to the stream of heating medium to be passed to the heating installation is decreased and, simultaneously, the cross-sectional area of the opening for the heated medium is increased. In summary, this will lead to an increase of the temperature of the medium to be passed to the heating installation. The increase or decrease of the temperature of the returned medium depends, as has been indicated in the foregoing, on the setting of the thermostatic valves associated with the radiators of the heating installations and will be in accordance with the respective heat requirements of a room. It will be readily appreciated that in this embodiment use can be made of a standard, known three-way mixing valve.

In accordance with yet another embodiment in accordance with the present invention there can be provided a first thermostatic working element including a sensor for determining the temperature of the heating medium to be passed to the heating installation and a second thermostatic working element including a return temperature sensor. The thermostatic working elements can actuate, in relation to the temperatures respectively determined, a moveable member of the mixing assembly and adjust the mixing ratio corresponding to the temperatures determined, with their respective displacement capacities appropriately being in agreement. It is accordingly of particular advantage that the thermostatic working elements comprise moveable control means which move in the same direction and which control means are capable of being coupled or engageable. The moveable means can include pistons and bellows or the like.

In another preferred embodiment of the invention there is provided a control device wherein the thermostatic working elements can actuate a piston means or the like, which piston can provide for an increase in the cross-sectional area of the orifice for the heated medium in relation to the decrease of the cross-sectional area for the medium to be added. The piston can co-operate with inlet and/or outlet openings or orifices in the housing therefor or with fixed counter-faces of the housing.

In accordance with one preferred embodiment, the piston means through which the heated medium can pass and which, in one of its end positions, covers at least one inlet orifice, while in its other end position, is capable of closing with a rearward, in the direction of the stream passing therethrough, face an inlet opening. The inlet opening is provided between the face and an abutment forming part of the housing, the abutment being preferably circular.

In another embodiment, the first thermostatic working element including the inlet sensor, i.e., the sensor determining the temperature of the medium to be passed to the heating installation, is formed as an expansion element including a control piston having a housing fixedly connected to the piston controlling the flow of the media. The control can be in operating contact with a spindle member which is concentrically disposed in the tubular piston, whereby the control piston can egress in the direction opposite to the flow direction of the heated medium through the tubular piston. When the control piston is prevented from exiting by the spindle member, on increase of the temperature of the medium to be passed to the heating installation, the control piston housing moves in the direction of flow of the heated medium, together with the piston since it is joined thereto. On decrease of the temperature of the medium to be passed to the heating installation and when the tubular piston is at rest, of course, the control piston housing is moved in the direction opposite to the flow of the heated medium. The movement of the piston housing of this expansion element in the medium to be passed to the heating installation is of the same magnitude as that of the tubular piston and, as well, in the same direction. The housing and the tubular piston are preferably joined by screw threads such that the housing is threaded with male threads.

In accordance with another embodiment, the opposite end of the spindle member, said member being capable of operatively joining the moveable control means, is in operative contact with the control means of the sensor for determining the temperature of the returned medium. This moveable control means moves away from its associated spindle end on increase of the temperature of the returned medium while the opposite end of the spindle member becomes fixedly coupled with the corresponding control means, i.e., the control means associated with the sensor for the temperature of the medium to be passed to the heating installation, or is brought in contact therewith by a spring. Thus, when the moveable control means of the return sensor tends to move away from the corresponding spindle end, due to action of the spring, the spindle, the tubular piston and the working element including the sensor for the temperature of the medium to be passed to the heating installation, will follow this movement. The joint movement is carried out on increase of the temperature of the returned medium whereby the spring will be compressed. The spring is preferably a helical compression spring which is capable of biasing the tubular piston in the direction opposite to the direction of flow of the medium therethrough. The other end of the spring can be supported in the housing of the control device.

In accordance with another embodiment, the moveable control means of the working element including the return sensor is connectible by means of capillaries with its expansion element and is removably connectible with the housing of the control device. The expansible sensor element is disposed at an appropriate location and is flooded by the returned medium. On increase of the temperature the expansion element expands. This leads to a migration of expansion material which reaches and moves, via capillaries, the moveable control means of the second thermostatic working element. Utilization of capillary ducts between the two components of the working element affords that the piping for the heating medium can be arranged in accordance with the other requirements for a heating installation. Repair or replacement of this working element can be carried out with ease since its moveable control means are removably attached to the housing of the mixing assembly.

In accordance with another preferred embodiment, the moveable control means of the return sensor, i.e., of the sensor determining the temperature of the medium being returned from the heating installation, is biased by means of a spring, preferably a helical compression spring, against the corresponding end of the spindle member. Due to the operative contact there is provided a lodging of the working element, respectively by the moveable control means thereof, against the spindle member.

In accordance with another embodiment, there is provided a pressure-differential relief valve next to the mixing assembly in the line of the heating medium to be passed to the heating installation. This valve ensures that the corresponding sensor is constantly flooded, when the valves associated with the radiators of the heating installation are closed and, thus, the temperature of the medium is continuously and accurately determined. When the medium remains in the lines, while the radiator valves are closed, the temperature of the medium decreases gradually with time and this is indicated by a decrease in the temperature sensed by the inlet sensor which will sense a progressively lower temperature, while the position of the control means remains unchanged.

In accordance with yet another embodiment of the present invention, there is provided a gaseous medium in the working elements which are arranged in a position facing each other whereby they are capable of actuating a control member which, in turn, actuates the control device. Movement of the control member is in response to the difference of the respective movements of each of the working elements when considered separately. The compressibility of the expansion medium allows an opposite positioning thereof. With respect to the effective operation afforded by the control member, there is no distinction in the operation of the embodiments described in the foregoing.

In accordance with a preferred embodiment, the specific displacement capacity of the inlet sensor is less than that of the return sensor. For example, when the temperature of the medium passed to the heating installation and the temperature of the returned medium each are increased by 5° C., then this will lead to a further increase of the temperature of the heating medium to be passed to the heating installation, since in the case of a mixing assembly, the tubular piston will cause an increase of the cross-sectional area of the inlet opening and will cause a decrease of the cross-sectional area of the opening for the returned medium.

In accordance with another embodiment, there is provided that the thermostatic working element including the return sensor includes a movement-limiting abutment or stop, operative during low temperature conditions and wherein the first thermostatic working element is operatively effective over a temperature range which is greater than the temperature range during which the movement-limiting abutment becomes operative. Thus, it will be ensured that, when using a mixing assembly, the tubular piston or the like, even at low temperature of the room, i.e., a room which is not heated, for example, the inlet for the heating medium from the boiler or the like is not completely closed which would prevent or affect the start-up of controlled heating. As is known, a decrease of the return temperature leads to a decrease of the cross-sectional area of the opening for the heating medium. On shut-down of the heating installation at the same time also the temperature in the heating medium to be passed to the heating installation is decreased. This, in turn, results in an opposite movement of the tubular piston. In the final result, the difference of these two movements becomes effective. However, when, on reaching a lower temperature, the movement of the control means of the return sensor is terminated, then at least due to the greater operating range, at least at low temperatures, the tubular piston can move until the return displacement of its moveable control means is brought to a halt. This provides a required gap through which the heating medium, e.g., hot water, can be introduced into the mixing assembly on re-use of the heating installation.

It is particularly advantageous that the working element including the return sensor is removable, thus, it can be removed and be replaced by a control which provides for a predetermined value. This results in the provision of a mixer for water wherein the energy is equally effectively utilized.

The invention will be further described in the following specification with reference to the accompanying drawings in which.

Figure 2:
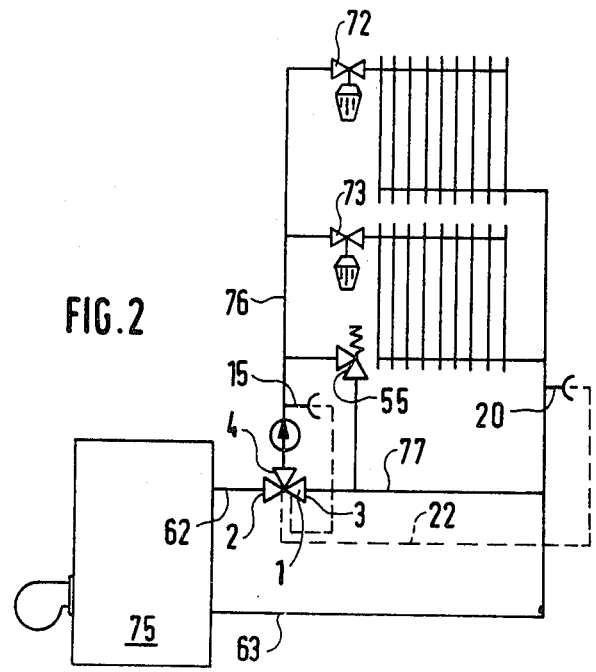
FIG. 2 represents a schematic flow diagram of a heating arrangement incorporating another embodiment of the present invention.

Housing 1 of the mixing assembly of the control device in accordance with the embodiment of the present invention shown in FIG. 2, comprises a pipe connecting end 2 for a pipe, not shown, passing therethrough a hot medium from a boiler. Preferably the hot medium is hot water and, accordingly, without being limited thereto, in the following submission instead of "medium" the term "water" is used.

Figure 3:
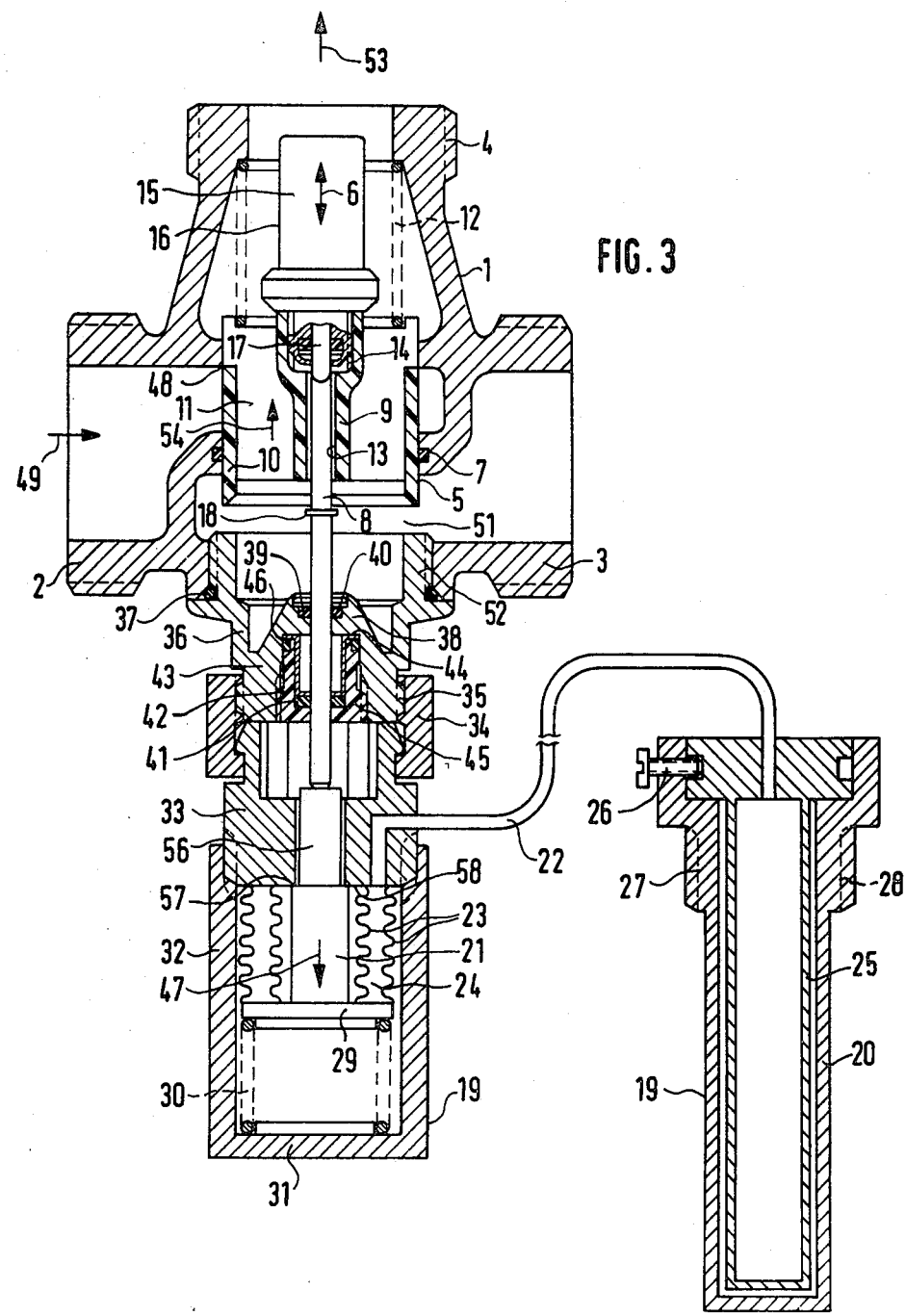
FIG. 3 is a vertical, longitudinal cross-section through the mixing assembly of the control device in accordance with the embodiment shown in FIG. 2.

The mixing assembly of the control device is shown in greater detail in FIG. 3 of the drawings. Thus, housing 1 comprises a pipe connecting end 3 for a pipe, not shown, for passing therethrough returned water and a pipe connecting end 4 for an inlet pipe, leading to radiators or the like of a heating installation, both not shown in FIG. 3. The pipe connecting ends 2 and 3 extend co-axially, while the pipe connecting end 4 extends normal to the axes of pipe connecting ends 2 and 3.

A tubular piston 5 is reciprocatingly moveable within housing 1 as is indicated by the arrow 6, indicating up and down movement. The piston is sealed with respect to housing 1 by the intervention of a seal ring, preferably an O-ring 7. Preferably, as well, the piston 5 is made of a suitable synthetic material. The piston 5 is disposed to be longitudinally moveable with respect to a central spindle 8 which passes through a bushing 9; bushing 9 being joined by way of ribs 11 to a tubular part 10 of the piston 5. The ribs 11 and the bushing 9 extend in length somewhat above the tubular part 10, i.e., in the direction of pipe connecting end 4. The upper edges of the ribs 11 provide contact points for a helical compression spring 12, the upper end of which bears against a suitable abutment, preferably in the region of the pipe connecting end 4. A central bore 13 in the bushing 9, joined to piston 5, as described, extends with its end directed towards the compression spring 12, into an enlargement having internal threads 14. A housing 15 is threadingly secured in the internally threaded enlargement of the bushing 9. Housing 15 forms part of a thermostatic working element 16 comprising an expansion material element. In the following description element 16 is at times also referred to as first thermostatic element. Thermostatic element 16 has a short moveable control piston 17 which is in contact with the upper end of the spindle 8, whereby the rounded end of the control piston 17 securely engages a correspondingly rounded cavity in the upper end of spindle 8. Spindle 8, furthermore, has a collar 18 or the like, which serves to limit the relative movement of the spindle 8 and the tubular piston 5 in one direction.

While the thermostatic working element 16 with the sensor for the medium in the inlet line, according to the embodiment of FIG. 3, is comprised of a so-called expansion material element, whereby the housing 15 forms the sensor, a second thermostatic working element 19, comprising the sensor for the return water temperature, is formed of three components namely, an expansion-sensor element 20, i.e., the component which directly senses the temperature of the returned water, a moveable piston 21 and capillaries 22 connecting element 20 and moveable piston 21. The moveable piston 21 is associated with double bellows 23, the space 24 of which is filled with expansion material. Expansion material is also provided in the capillaries 22 and the longitudinal, hollow, cylindrical part 25 of the expansion sensor element 20, part 25 being retained by means of a screw 26 in a collar 27 having external threads 28.

Plate 29 of the moveable part 21 of thermostatic element 19, including the return sensor is in contact with a helical compression spring 30 with one end thereof, while the other end of the spring 30 is in contact with the bottom wall 31 of a hollow cylindrical cap 32. The assembly comprised of moveable piston 21, double bellows 23, spring 30 and cap 32, as well as a connecting piece 33, is removably mounted onto housing 1 of the piston 5. A nut 34 is provided for this which threadingly engages the threads 35 of a removable, downwardly extending, housing section 36. Housing section 36 is sealed with respect to the remainder of the housing by means of a seal ring, preferably an O-ring 37.

The spindle 8 is sealingly guided in a transverse separating wall 38 provided in removable housing section 36. A seal is provided, i.e., an O-ring 39 which is retained by a turned-over rim 40. Further sealing is achieved for the spindle 8 by another O-ring 41 which is retained by externally threaded bushing 42 and a cup member 43. Between the outwardly directed flange portion 44 of the cup member 43 and the upper end 45 of the bushing 42, there is provided a further O-ring 46 for sealing the specified parts with respect to removable housing section 36.

On increase of the temperature of the returned water, the expansion material contained within the cylinder 25 of the expansion-sensor elements 20 expands and the expansion material migrates, via the capillaries 22, to the space 24 of the double bellows. Consequently, the moveable piston 21 of the thermostatic working element 19 including the return sensor, moves in the direction of arrow 47, i.e., downwardly. This causes compression of spring 30. The piston 5 and spindle 8 are also moved in downward direction since they are biased by spring 12. As the piston moves in downward direction, it increases the effective entry opening 48 for the entry of hot water passed from a boiler, heat-exchanger, district heating network or the like, not shown, in the direction of arrow 49. In relation to the increase of the quantity of hot water which exits with the mixed water from housing 1, in the direction of arrow 53, the volume of return water, admitted through connecting end 3 to the housing, can be reduced. The portion of the return water which is not passed through the housing can be brought to the boiler or the like for re-heating by means of another pipe connection.

Accordingly, at the rate at which the effective entry opening 48 is being increased, the other, inlet opening 51 for returned water is decreased. Opening 51 is formed by the downwardly directed end of the tubular section 10, opposite to the end associated with spring 12, and the upwardly directed annular portion 52 of housing 1 and, respectively, by the removable housing section 36. As the temperature of the returned water decreases, the moveable piston 21, spindle 8 and piston 5 are returned in the direction opposite to that indicated by the arrow 47, leading to compression of spring 12 and expansion of spring 30. In consequence, the effective opening 51 for returned water is increased and the effective opening 48 for hot water is decreased.

When the temperature of the medium passed to the radiators increases, the expansion material within the housing 15 of the first thermostatic element 16 expands. Since the moveable control piston 17 is counter-acted by the spindle 8, the housing 15 is displaced upwardly, with respect to the control piston 17, in the direction of arrow 53. However, since the housing 15 is securely coupled to the piston 5 by means of threads 14, as described, piston 5 is also displaced in upward direction. Thus, an increase in the temperature of the medium passed to the radiators will cause a decrease of the effective opening 48 for hot water, while, simultaneously, increasing the effective opening 51 for returned water. Of course, a decrease in the temperature of the water passed to the radiators causes the respective opposite functioning. Due to the interrelationship of the inlet and returned water temperatures and the interrelationship of the working elements of the respective sensors, it will be apparent that the specific working ranges of the first and second thermostatic sensor elements have to be correlated.

Preferably, the specific working or operating range of the first thermostatic element is less than that of the second thermostatic working element, i.e., equal changes in the temperatures sensed by the respective elements will cause a larger displacement of the return sensor, compared to that of the inlet sensor. It is again pointed out that the entire control is also in co-operation with one or several thermostatic working elements of one or more radiator valves.

The moveable control piston 21 of the thermostatic working element 19 including the return sensor comprises a cylindrical portion 56 which is of reduced diameter for moveable disposal in the central bore of connecting piece 33. The reduced diameter furnishes an annular counter-face which can co-operate with the downwardly directed face 58 of the connecting piece 33. The annular counter-face forms a stop 57 for the control piston 21 of the thermostatic working element 19. It becomes effective when the return water temperature decreases below a preselected value. This applies particularly to shut-down of the heating installation during the warmer seasons. Advantageously, thermostatic working element 16 has an effective working range over a temperature range which is greater than the (temperature) range during which the stop 57 becomes effective. Thus, during a further drop in the temperature of the heating medium, piston 5 can carry out a movement which is opposite to the direction indicated by arrow 54, i.e., it is in downward direction. This is important because when the stop 57 is operatively engaged, the effective opening 48 for hot water can be closed. When the subsequent opening, on further reduction of the header water temperature, does not take place, the hot water could not be passed to the first thermostatic working element 16, on reactivation of the heating installation, and the installation would remain in a self-locked condition.

Figure 1:
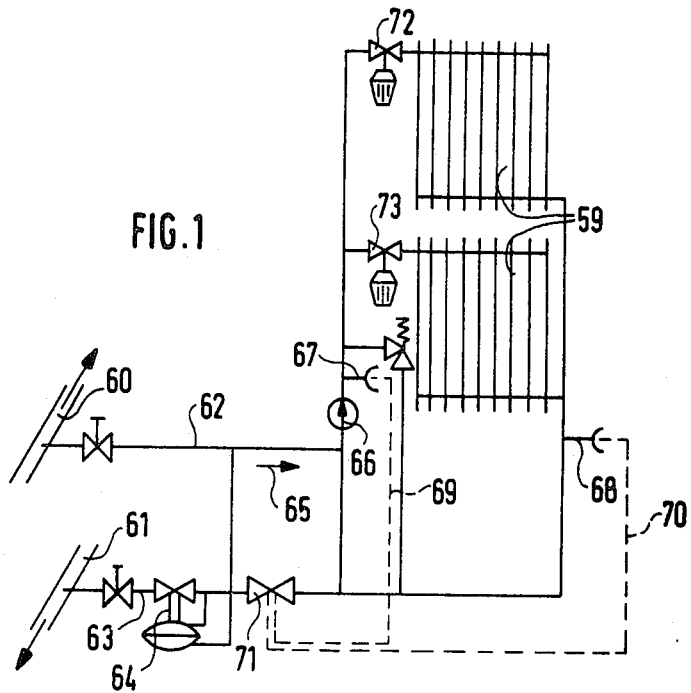
FIG. 1 represents a schematic flow diagram of a heater arrangement incorporating one embodiment of a control device in accordance with the present invention.

As schematically indicated in FIG. 1, a heating installation comprises radiators 59 connected to a district heating network. The delivery line is designated by numeral 60 and the return line is designated by numeral 61. Conduit 62 leads to the house heating system and the return line from the house heater is designated by numeral 63. Between these two there is provided a pressure differential control means 64. Viewed in flow direction, indicated by arrow 65, next following to a pump 66, there is provided an inlet temperature sensor 67. The return line 63 comprises a temperature sensor 68. The respective temperatures sensed by the two sensors are transmitted, via the lines 69 and 70, shown in dash lines, respectively, to control means 71. Control means 71 comprises a throughput valve the valve-closing member of which is actuable by a thermostatic working element of the inlet sensor and by a thermostatic working element of the return sensor, respectively. When, in accordance with the temperature difference in the inlet and the return lines, the volume passed through the valve of the control means 71 is throttled, i.e., is reduced, the volume passed through conduit 62 is automatically reduced. A further reduction in the volume passed through inlet line can be controlled by the radiator valves 72 and 73, respectively. The opening of the valve 72 or, respectively, of the valve 73, is in relation to the prevailing room temperature. Control means 71, of the heating installation shown in FIG. 1, operates in a similar sense as the control means comprising first and second thermostatic working elements 16 and 19, of FIG. 3, as described in detail in the foregoing.

Such a control means is incorporated in the heating installation shown in FIG. 2.

The inlet temperature sensor, provided by the housing 15 of the first thermostatic working element 16, is shown separately in the schematic representation of FIG. 2, since the thermostatic working element including the sensor for the medium passed to the radiators, may be constructed of the components as that having the sensor 20 utilized for the determination of the temperature returned medium.

Lines 22 and 74 lead, respectively, to the working elements in the mixing assembly. Conduit 62 and return line 63 for the heating medium, respectively, heating water, are in communication, in accordance with the embodiment shown in FIG. 2, with a boiler 75. Alternatively, the installation could be associated with the secondary circuit of a heat-exchanger device.

In the embodiment shown in FIG. 2, there is further provided a pressure-differential relief valve 55. This is in communication, with the pipe connection 4, via conduit or pipe 76, and is connected to the mixing assembly by means of pipe 77 leading to pipe connection 3. In addition to the known advantages of such pressure-differential relief valves, there is achieved a continuous flooding of the sensor 15 of the first thermostatic working element including the inlet line sensor, even when the radiator thermostatic valves 72 and 73 are closed. Thus, the inlet sensor determines the actual temperature corresponding to the operating position of the mixing assembly, which, in the absence of a pressure-differential relief valve and with closed radiator valves, with an increasing closing time of the latters, always can be achieved with less certainty.

Figure 4:
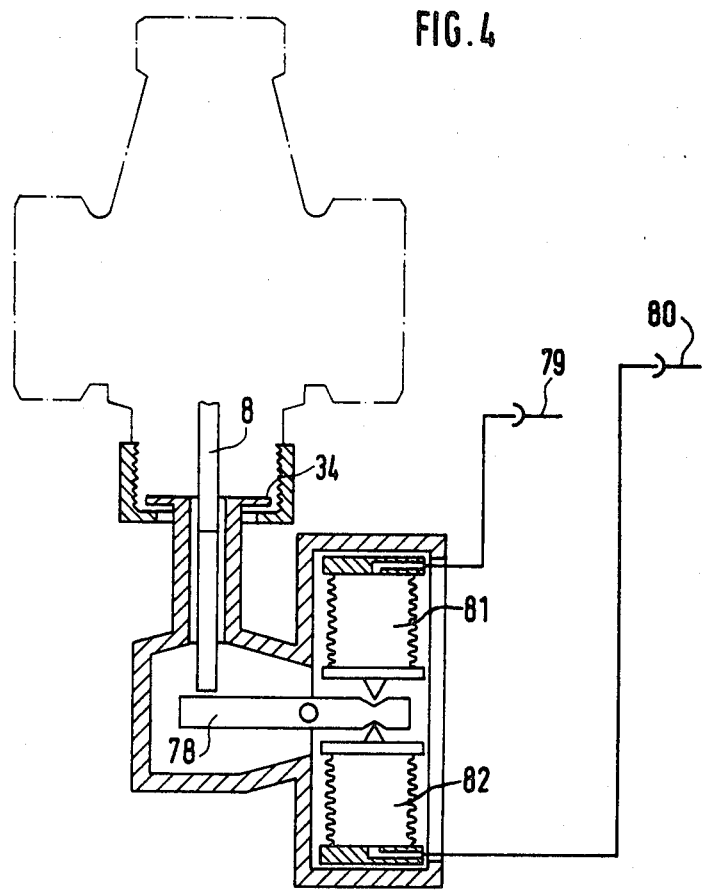
FIG. 4 shows schematically a detail of a further embodiment.

The thermostatic working elements of the embodiments described comprise, preferably, an expansible material, i.e., a wax or a wax-like material. When using a gas, instead, the control member of the mixing assembly, or valve, may be actuated upon by two bellows 81 and 82 operating in opposite directions (FIG. 4), wherein the control member is provided by a pivotally mounted lever 78. The inlet sensor is indicated by numeral 79 and the return sensor is indicated by numeral 80. It will be apparent that a gaseous medium passing to bellows 81 will actuate the lever 78 in clockwise direction, while, conversely, gases passing to bellows 82 will actuate the lever 78 to move in counter-clockwise direction.

What I claim as new and desire to protect by Letters Patent of the United States is:

1. A control device for a heating installation including one individually temperature controlled radiator means, first means for passing a heating medium to the heating installation and second means for returning the heating medium from the heating installation to mix with said heating medium passing into said heating installation, moveable means in said first and second means and control means actuable in response to the temperature of said heating medium and returning heating medium, said control means operating on said moveable means to vary inversely the flow of said heating medium as compared to the returning heating medium to maintain a pre-determined temperature drop between the heating medium passing to said radiator means and returning therefrom, said control means including a first thermostatic working element having a sensor for determining the temperature of the heating medium being passed to the heating installation and a second thermostatic working element having a sensor for determining the temperature of the heating medium being returned from said heating installation.

2. A control device according to claim 1 wherein said first and second means is a housing having a first passage means for the heating medium flowing into said radiator and a second passage means for receiving the returning flow from said radiator to mix with said heating medium flowing into said radiator and said moveable means is a tubular piston operable on said first and second passage means whereby on increase of the temperature of the heating medium being returned the cross sectional area of the first passage means is increased and the cross sectional area of the second passage means is decreased.

3. A control device according to claim 2 wherein the returning medium flows through said tubular piston to mix with the heating medium being passed to the heating installation.

4. A control device according to claim 3, wherein said control means further comprises a first moveable control piston associated with said first thermostatic working element and adapted to move in at least one direction, and a second moveable control piston associated with said second thermostatic element and adapted to move in at least one direction, with said first and second control pistons being adapted to move in the same direction when the temperature of both the heating medium and the returning heating medium is increased, said pistons being operatively engageable.

5. A control device according to claim 4 wherein said thermostatic elements actuate said tubular piston to provide an increase in the cross-sectional area of the first passage means permitting entry of the heating medium to be passed to the heating installation in the proportion in which the tubular piston provides a decrease of the cross-sectional area of the second passage means for the heating medium being returned from the heating installation which is to be added to the heating medium to be passed to the heating installation.

6. A control device according to claim 4 having a spindle member disposed in a central longitudinal bore in said tubular piston with said first moveable control piston in operative contact with one end of said spindle member and moveable in the direction opposite to the flow direction of the heating medium returning through said tubular piston means.

7. A control device according to claim 6 wherein the housing of the first thermostatic working element is removably connected to said tubular piston.

8. A control device according to claim 7 wherein said tubular piston and said housing of the first thermostatic working element are connected by a screw thread.

9. A control device according to claim 6 wherein said first moveable control piston is held in operative contact with the one end of said spindle member by means of a first compression spring.

10. A control device according to claim 9 wherein said compression spring is a helical spring which is capable of biasing said tubular piston in a direction opposite to the flow of returning heating medium passing through the tubular piston.

11. A control device according to claim 4 wherein the second moveable control piston of the second thermostatic working element includes capillaries for communicating with the sensor element for sensing the temperature of the returning heating medium and wherein said second control moveable piston is removably associated with said housing means.

12. A control device according to claim 1 wherein said first thermostatic working element has a specific operating displacement capacity which is less than the operating displacement capacity of the second thermostatic working element.

13. A control device according to claim 1 wherein said second thermostatic working element further includes a movement limiting abutment operated during low temperatures and wherein the first thermostatic working element is operatively effected over a temperature range greater than the corresponding temperature during which said abutment becomes operative.

* * * * *